J. S. HOLLIDAY.
ELECTROMAGNETIC MEASURING INSTRUMENT.
APPLICATION FILED MAY 14, 1915.

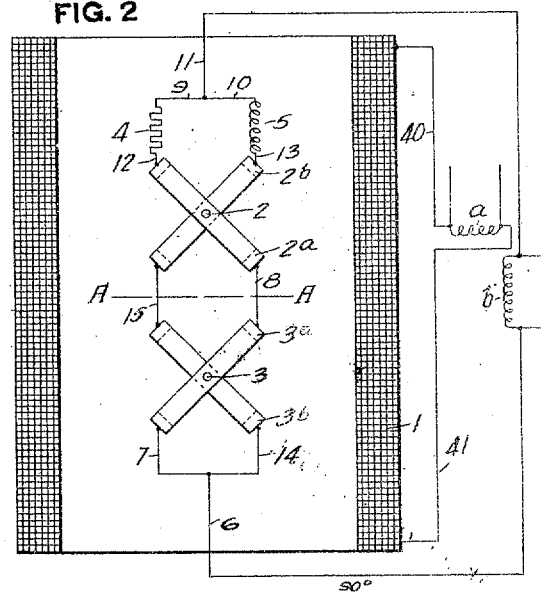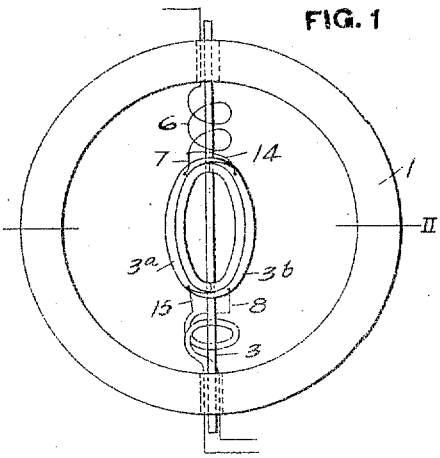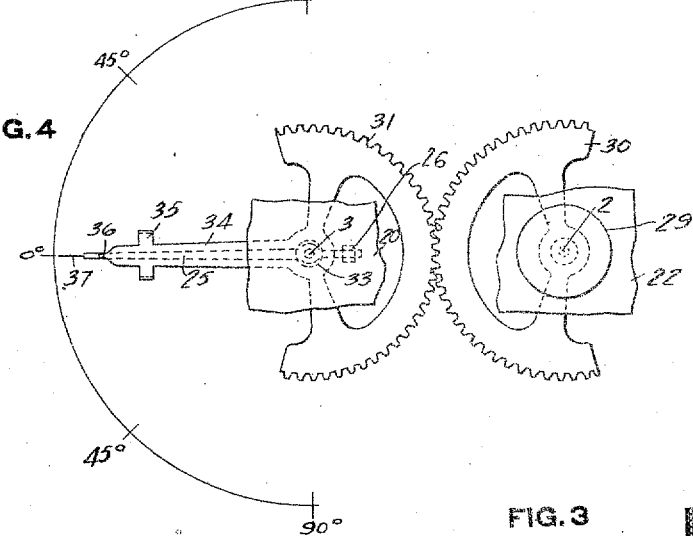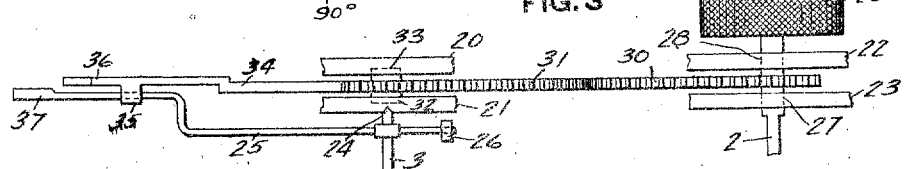

1,259,515.

Patented Mar. 19, 1918.
3 SHEETS—SHEET 2.

WITNESSES

INVENTOR

J. S. HOLLIDAY.
ELECTROMAGNETIC MEASURING INSTRUMENT.
APPLICATION FILED MAY 14, 1915.

1,259,515.

Patented Mar. 19, 1918.
3 SHEETS—SHEET 3.

WITNESSES

INVENTOR
John S. Holiday

UNITED STATES PATENT OFFICE.

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTROMAGNETIC MEASURING INSTRUMENT.

1,259,515.   Specification of Letters Patent.   Patented Mar. 19, 1918.

Application filed May 14, 1915.  Serial No. 28,033.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Electromagnetic Measuring Instruments, of which the following is a specification.

My invention relates to electromagnetic measuring instruments, and more particularly to those types of instruments adapted to determine the phase difference between electromotive forces in any two parts of a polyphase system.

Instruments of this character usually comprise two windings or sets of windings, one being movable with relation to the other, and carrying the currents from the two sources whose phase relation is to be determined, the phase displacement being indicated by the position of one winding or set of windings with relation to the other. But when such instruments are used to indicate phase relations in circuits where very small amounts of power are available, as, for example, in track circuits used for railway signaling, the accuracy of the reading is impaired because of the fact that electromotive forces are induced in one of the windings or sets of windings due to the varying magnetic field produced by the other winding or windings. One object of the present invention is the provision of means for neutralizing these induced electromotive forces and so materially increasing the sensitiveness and accuracy of the instrument.

I will describe two forms of instruments embodying my invention, and then point out the novel features thereof in claims.

Figure 5:
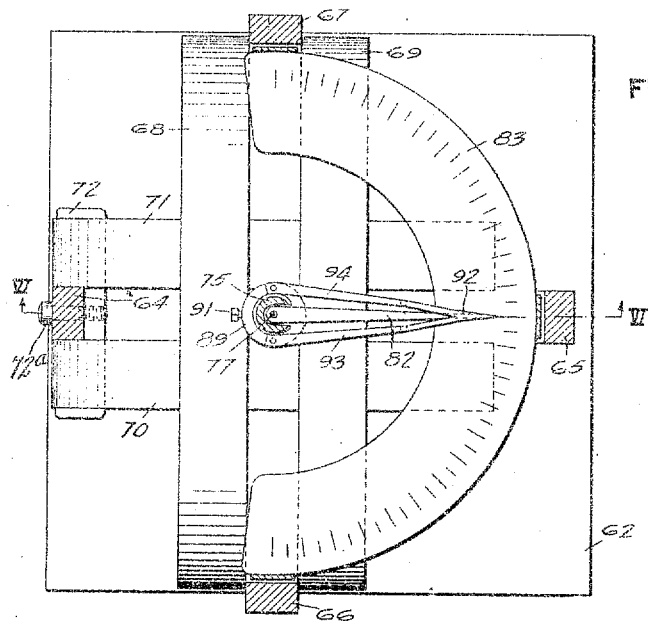
Figure 8:
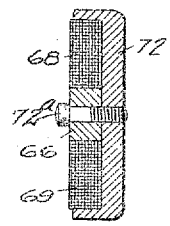
Figure 9:
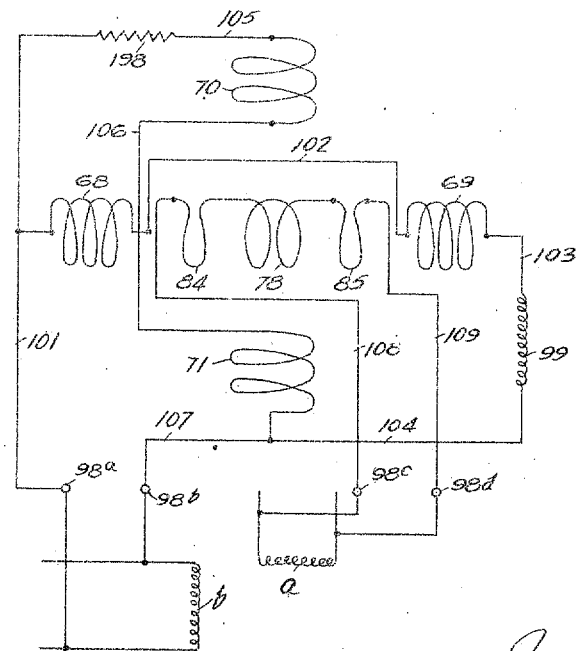
Figure 7:
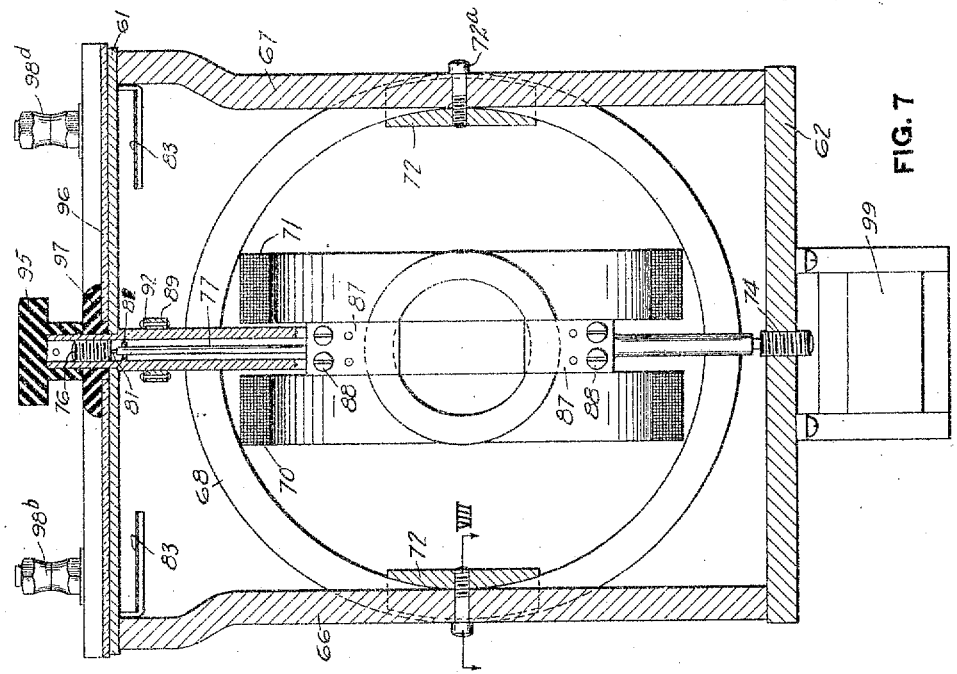
Figure 6:
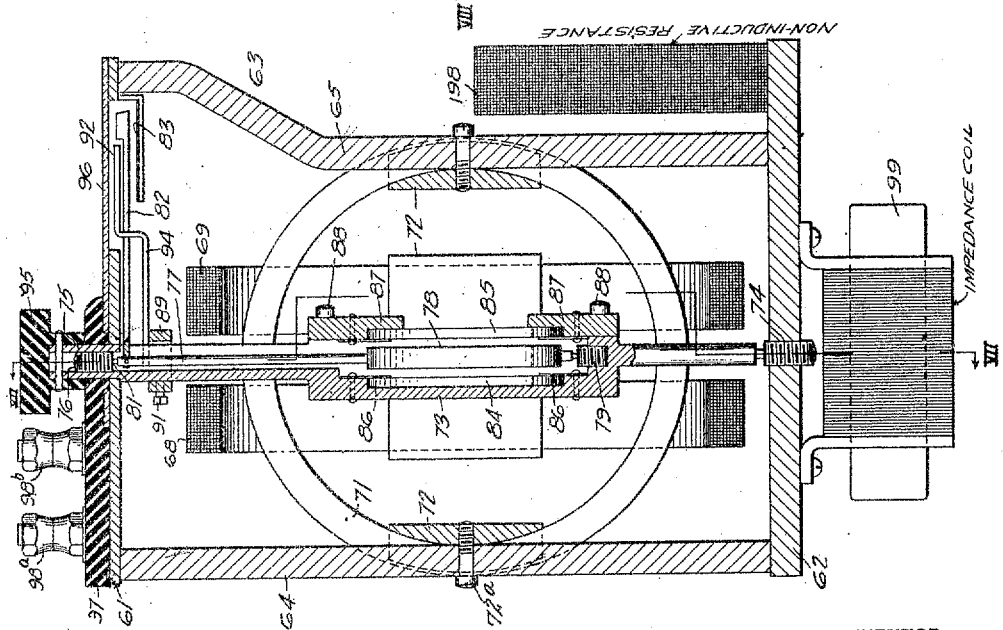

In the accompanying drawings Figure 1 is a view showing in elevation part of one type of instrument embodying my invention. Fig. 2 is a plan view of that part of my instrument shown in Fig. 1 partly sectioned by a plane II—II. Figs. 3 and 4 are an elevation and a plan view, respectively, of another part of the instrument shown in Figs. 1 and 2. Fig. 5 is a plan view of another type of instrument embodying my invention with the cover thereof removed. Fig. 6 is a vertical sectional view of Fig. 5 on line VI—VI, looking in the direction of the arrows. Fig. 7 is a sectional view of Fig. 6 on line VII—VII, looking in the direction of the arrow. Fig. 8 is a view showing a section of Fig. 7 on line VIII—VIII, looking in the direction of the arrows. Fig. 9 is a diagrammatic view showing one arrangement of circuits adapted to be used with the instrument shown in Figs. 5 to 7.

Similar reference characters refer to similar parts in each of the several views.

Referring first to Figs. 1 and 2, I have here shown a solenoid 1 in which are mounted two vertical shafts 2 and 3, carrying coils $2^a$ and $2^b$, $3^a$ and $3^b$. The planes of coils $2^a$ and $2^b$, $3^a$ and $3^b$ are vertical, and coils $2^a$ and $3^a$ are set at right angles to coils $2^b$ and $3^b$ respectively. This is shown more clearly in the plan view, Fig. 2, wherein the upper half of the solenoid has been removed by cutting it by a horizontal plane through line II—II shown in Fig. 1. The movable elements have not been cut by the plane, however, and are shown in plan view. Coils $2^a$ and $3^a$ are electrically insulated from coils $3^a$ and $3^b$ respectively. I provide also a non-inductive resistance 4 and an inductance 5. Coils $3^a$ and $2^a$ are connected in series with the resistance 4, the connections being: from wire 6, wire 7, coils $3^a$, wire 8, coil $2^a$, wire 12, resistance 4, wire 9 to wire 11. Coils $3^b$ and $2^b$ are connected in series with the inductance 5 by the following connections, from wire 6, wire 14, coil $3^b$, wire 15, coil $2^b$, wire 13, inductance 5, wire 10 to wire 11. Although, to make the drawing clear, I have shown straight connecting wires attached to the coils, in actual construction they are attached to the coils in such manner that the coils may be rotated. The conductors leading to and away from coils $3^a$ and $3^b$ are very slender springs coiled around shaft 3, as indicated in Fig. 1, so that they produce no appreciable torque when these coils are displaced through an angle. This precaution is necessary so as not to impair the sensitiveness of my instrument for coils $3^a$ and $3^b$ are to respond to small magnetic forces as pointed out hereinafter. This precaution need not be taken in attaching the lead-in and lead-out wires to coils $2^a$ and $2^b$ which are rotated by external force as explained below.

Suppose now that an alternating electromotive force is impressed on solenoid 1.

Current flowing in the winding of the solenoid sets up an alternating magnetic field, the direction of which within the solenoid is parallel to the axis of the solenoid. This flux I shall call the field flux. Suppose that another alternating electromotive force of the same frequency is impressed across wires 6 and 11. Then, as is well understood by those versed in the art, the currents flowing in coils $2^a$—$3^a$, and $2^b$—$3^b$ are nearly 90° out of phase with each other, if the resistance 4 and the inductance 5 are made large enough.

Confining one's attention for the present to coils $3^a$ and $3^b$, it is apparent that a rotating magnetic field is set up in these coils. The angular velocity of this magnetic field expressed as revolutions per second is equal to the frequency of the current in coils $3^a$ and $3^b$ in cycles per second. In other words, the magnetic field rotates at such a speed as to reverse itself completely in a half cycle. It was pointed out above that the field flux set up by the solenoid 1 alternates with a frequency equal to that of the current in the solenoid, i. e., the field flux reverses from a maximum in one direction to a maximum in the other direction in a half cycle. Hence it is apparent that the coils $3^a$ and $3^b$, if free to move, always assume such a position that the rotating magnetic field set up by these coils coincides in direction and sense with the alternating magnetic field once every half cycle, at the instant when the alternating flux is of maximum intensity.

Suppose now that the electromotive force impressed on solenoid 1 is in phase with the electromotive force impressed on wires 6 and 11. Then, as explained above, coils $3^a$ and $3^b$ assume a definite position with respect to the solenoid, which position may be called that of zero phase difference.

Suppose now that the electromotive force impressed on wires 6 and 11 lags by an angle θ behind the electromotive force impressed on solenoid 1. Then the magnetic field set up by the coils $3^a$ and $3^b$ lags by an angle θ behind the angular position it would occupy if the electromotive force impressed on wires 6 and 11 were in phase with the electromotive force impressed on solenoid 1. Consequently, whenever the magnetic field set up by the field coils is a maximum in either direction, the rotating magnetic field is displaced from the direction of the alternating field flux by an angle θ, and a torque is produced by the interaction of the two fields, whereby coils $3^a$ and $3^b$ are turned through an angle θ, so that the rotating and the alternating field fluxes again coincide in direction and sense, once every half cycle at the instant when the alternating field flux is of maximum intensity.

Similarly, when the electromotive force impressed across wires 6—11 leads the electromotive force impressed in solenoid 1, by an angle θ the coils $3^a$ and $3^b$ are turned from the position of zero phase difference through an angle θ in the opposite direction.

Thus a pointer operatively connected with coils $3^a$ and $3^b$ will show automatically on a properly calibrated scale the phase displacement between the electromotive forces applied to the solenoid 1 and impressed across the wires 6—11.

The alternating flux which threads the movable coils sets up an electromotive force in these coils and, unless preventive means were employed, current would flow due to this electromotive force in the closed circuit of which these coils are a part, whereby the accuracy of the instrument would be impaired when a small electromotive force is applied to the moving coils. One of the methods by which this flow of current can be prevented is as follows.

Coils $2^a$ and $2^b$ are similar to coils $3^a$ and $3^b$ respectively. By mechanism to be described below, coils $2^a$ and $2^b$ are held at such a position as to have mirror symmetry with respect to coils $3^a$ and $3^b$, whenever a reading is to be taken on the instrument. In other words, the coils are so arranged that, if a mirror were placed vertically midway between shafts 2 and 3, i. e., on line A—A shown in Fig. 2, then coils $2^a$ and $2^b$ would be coincident with the images of coils $3^a$ and $3^b$ respectively in the mirror. To accomplish this it is evident that the two shafts must always be turned through equal angles in opposite directions. In this condition the flux that threads coil $3^a$ is always equal to the flux threading coil $2^a$. Hence by winding these coils in the proper direction the electromotive forces set up due to the change of linkages of flux and turns of wire can be entirely neutralized. In the same manner the electromotive force induced in coils $3^b$ and $2^b$ may be neutralized. As a result, then, the disturbing influence caused by the induced electromotive forces is overcome. Of course, the same result may be accomplished by turning the two sets of coils through the same angle in the same direction, if the direction of the winding of the coils is changed correspondingly.

Referring now to Figs. 3 and 4, I have here shown diagrammatic sketches showing an elevation and a plan view, respectively, of one form of mechanism by which coils $2^a$ and $2^b$ are kept at positions of mirror symmetry with respect to coils $3^a$ and $3^b$. Reference characters 20, 21, 22 and 23 designate plates rigidly attached to stationary members of the instrument, the rest of which is broken away, so as not to obscure the view of the members to be described. Shaft 3, which carries coils $3^a$ and $3^b$ as described above rotates in an upper bearing 24 in plate 21, the lower bearing and the coils attached to the shaft I have not shown. A light pointer 25 is attached to shaft 3, and balanced by a counterweight 26. The bearings on which shaft 3 rotates are preferably of the jewel type, so that no appreciable frictional resistance is offered to the angular movement of the shaft. Shaft 2 which is free to rotate in a lower bearing not shown, and in upper bearings 27 and 28 in plates 22 and 23 respectively, carries at its upper end a knurled head 29, by which the shaft and, of course, coils 2ª and 2ᵇ, which are rigidly attached to the shaft, may be rotated. A segmental gear 30 is fixed to shaft 2, between plates 22 and 23 as shown. Another segmental gear 31 adapted to engage gear 30 is rotatably mounted between plates 20 and 21 in bearings 32 and 33, the center line of which coincides with that of shaft 3. A pointer 34, which carries near its end a bracket 35, is rigidly mounted on gear 31, so that pointer 25 is restricted in its angular movement by the bracket 35. Pointer 34 can be alined with pointer 25 by bringing its tip 36 into line with tip 37 of pointer 25. Gears 31 and 30, are of 1:1 ratio, hence a clockwise twist of knob 29 gives pointer 34 counter-clockwise rotation of the same angular magnitude. Hence, if coils 3ª and 3ᵇ are turned through any angle in one direction, as indicated by tip 37 of pointer 25, and pointer 34 is turned through the same angle in the same direction by turning knob 29 then coils 2ª and 2ᵇ have been turned through the same angle as coils 3ª and 3ᵇ, but in the opposite direction. Thus, mirror symmetry as described above is retained.

To illustrate the use of the apparatus suppose it is desired to measure the phase displacement of the electromotive forces in any polyphase system, of which I have shown two phases $a$ and $b$ in Fig. 2. The moving elements are electrically connected to one phase $b$ by means of wires 6 and 11, and the solenoid is connected to the other phase $a$ by means of wires 40 and 41. If there is any phase difference between the electromotive forces in phases $a$ and $b$, coils 3ª and 3ᵇ and consequently pointer 25 are drawn toward a position to the left or right of the position of zero phase difference and move to the left or right, until prevented from further rotation by bracket 35 on pointer 34. Then knob 29 is turned in the opposite direction so that pointer 34 follows pointer 25 until it comes to rest. Before taking a reading the tips of the pointers should be carefully alined. The scale may be calibrated in any convenient manner. e. g. in terms of angle or power factor.

If the phase displacement between the two currents is greater than 90°, pointer 25 will tend to go beyond the calibrated scale. To read such angles it is necessary only to reverse the direction of flow of current in one winding, either in the solenoid or in the moving coils. Suppose the current in the solenoid is reversed by interchanging the connections of leads 40 and 41 to phase $a$. Then the magnetic field set up by the solenoid is reversed in direction. Hence, the position to which the moving coils are turned is diametrically opposite that to which they would have been moved if the leads to the solenoid had not been reversed. For example, if by trial it is found, when a reading is to be taken, that the pointer is thrown off the scale to the left, whereupon one pair of leads is reversed and the indication is θ° to the right, then the actual phase displacement between the two currents compared is 90°+(90°−θ°) or (180°−θ°).

Instead of making the solenoid stationary and the coils producing the rotating magnetic field movable, the former may be made movable and the latter stationary, as I shall now describe with reference to Figs. 5, 6 and 7. Reference characters 61 and 62 designate respectively an upper and a lower plate secured to the ends of posts 64, 65, 66 and 67. Two pairs of coils 68—69 and 70—71, adapted to coact to set up a rotating magnetic field as hereinafter set forth are held vertically and at right angles to each other as I shall now describe. With reference especially to Fig. 8, coils 68 and 69 are secured to post 66 by means of a bracket 72 fixed to post 66 by a screw 72ª and are secured in a similar manner to post 67 opposite to post 66 (see Fig. 7), so that they are firmly held parallel to each other in a vertical plane. In a similar manner coils 70 and 71, the external diameter of which is less than the internal diameter of coils 68 and 69, are held by means of brackets 72 and posts 64 and 65 at right angles to coils 68 and 69. A casting 73 of non-magnetic material is mounted at its lower end in a trunnion screw secured in plate 62, and is shaped at its upper extremity into a round hollow shaft 75 which is journaled in a hole through plate 61, so that it may be turned by means of a knurled head 95 pinned to the shaft. Below plate 61 casting 73 is hollow and slotted longitudinally so that a shaft 77 of non-magnetic material can be inserted therein. A flat coil 78 adapted to produce an alternating field as pointed out hereinafter is fastened vertically to shaft 77 which is mounted in a lower bearing 79 and in an upper bearing 81 located in trunnion screw 76 in shaft 75; these bearings are preferably of the jewel type. A light pointer 82 adapted to indicate on a scale 83 is fixed to the upper end of shaft 77. A coil 84, similar to coil 78, but of half the number of turns is clamped into a hollow in casting 73, by means of plates 86 of non-magnetic material riveted to casting 73. A coil 85, similar to coil 84 is fixed by similar means to lugs 87 of non-magnetic material which are secured to casting 73 by means of screws 88. In this manner coils 84 and 85 which are provided to compensate electromotive forces induced in coil 78, as described hereinafter, are held parallel to each other and equidistant from coil 78, so that in a uniform magnetic field, when coil 78 is parallel to the other two, an equal amount of flux cuts all three coils. A collar 89 secured near the upper end of casting 73 by means of a screw 91 serves as a support for a pointer 92, which consists of two arms 93 and 94, each of which is riveted to collar 89. Near their middle, arms 93 and 94 are bent upright, so that the tip of pointer 92 is above that of pointer 82. By this means pointer 82 is limited to a small angular displacement with respect to pointer 92, so that the rotation of coil 78 with respect to coils 84 and 85 is also limited to a small angle. Plate 61 is provided with a slot under which is placed a scale 83, the slot being covered by a glass plate 96. Binding posts 98$^a$ to 98$^d$ are mounted on a hard-rubber plate 97 which covers the remainder of plate 61. 198 is a non-inductive resistance and 99 is an inductance, which are connected in circuit with the coils as I shall now describe.

With reference to Fig. 9 reference characters 98$^a$, 98$^b$, 98$^c$ and 98$^d$ designate respectively the four terminal posts. Coils 68 and 69 are connected in series with inductance 99 in the circuit: from terminal 98$^a$, through wire 101, coil 68, wire 102, coil 69, wire 103, inductance 99, wires 104 and 107 to terminal 98$^b$. Similarly coils 70 and 71 are connected in series with resistance 198 by the circuit: from terminal post 98$^a$ through wire 101, resistance 198, wire 105, coil 70, wire 106, coil 71, wire 107 to terminal post 98$^b$. When resistance 198 and inductance 99 are of the proper values, an alternating electromotive force applied to terminals 98$^a$ and 98$^b$ causes such currents to flow in the circuits described above that a rotating magnetic field is set up by the stationary coils. Coils 84, 78 and 85 are connected in series to terminals 98$^c$ and 98$^d$ by wires 108 and 109 so that each one of the coils produces an alternating magnetic field when an alternating electromotive force is applied to the terminals.

Suppose now that alternating electromotive forces of equal frequency are impressed across terminals 98$^a$—98$^b$ and 98$^c$—98$^d$. In Fig. 9 I have shown these electromotive forces to be respectively the differences of potential across phase $a$ and phase $b$ of a two phase system. Confining one's attention for the present to coils 68—69, 70—71 and 78 it is apparent that the rotating and alternating magnetic fields set up by the above coils interact, as described for the instrument shown in Fig. 2. In this case, however, the coil which produces the alternating field is the movable one, so that it will, if unrestrained, turn to a definite position with respect to the stationary coils. This position varies with the phase difference of the electromotive forces in phases $a$ and $b$, and scale 83 can be calibrated so that pointer 82 indicates these phase differences as described hereinbefore.

Electromotive forces are induced in coil 78 due to the variation of flux threading it. Hence coils 84 and 85 are connected reversedly in series with coil 78 so that equal changes of flux in the three movable coils induce equal and opposite electromotive forces in the series circuit in which these coils are connected. In this manner the sensitiveness of the instrument remains unimpaired when the connection across terminal posts 98$^c$ and 98$^d$ is of low impedance.

In order that the changes in flux threading coils 84, 78 and 85 may be equal and the induced electromotive forces in these coils may be completely neutralized, these coils must be parallel to each other. This position is indicated by pointer 92, which is so adjusted with respect to casting 73 that when it coincides in direction with pointer 82, coils 84 and 85 are parallel to coil 78.

The use of this instrument is similar to the use of the instrument described hereinbefore. When the connections are as shown in Fig. 9, pointer 82 tends to swing to a definite position with respect to scale 83, but it is prevented from moving through more than a small angle by pointer 92. The head 95 is turned by hand so that pointer 92 follows pointer 82, until the two coincide in direction, whereupon a reading on scale 83 may be taken.

Although I have herein shown and described only certain forms of instruments embodying my invention, it is understood that various changes and modifications may be made therein within the scope of the appended claims without departing from the spirit and scope of my invention.

Having thus described my invention, what I claim is:

1. An electrical instrument comprising means for producing an alternating magnetic field, means for producing a rotating magnetic field, one of said means being mounted to move with relation to the other, and means for neutralizing the electromotive force induced in one of said means by the other.

2. In combination, means for producing an alternating magnetic field, means for producing a rotating magnetic field, one of said means being mounted rotatably within the other, mechanism for indicating the relative angular position of said two means, and means for neutralizing the electromotive force set up in one of the means.

3. An electrical instrument comprising a member carrying windings for producing a rotating magnetic field, a member carrying a winding for producing an alternating magnetic field, means for mounting one of said members for movement with relation to the other, and means for neutralizing the electromotive force induced in the winding or windings on the movable member by the winding or windings on the other member.

4. An electrical instrument comprising a member carrying windings for producing a rotating magnetic field, a member carrying a winding for producing an alternating magnetic field, said members being mounted so that the two fields interact and so that one member is movable with relation to the other, means for indicating the angular position of the movable member with relation to the other, and means for neutralizing the electromotive force induced in the winding or windings on the movable member by the winding or windings on the other member.

5. An electrical instrument comprising a member carrying windings for producing a rotating magnetic field, a member carrying a winding for producing an alternating magnetic field, one of said members being mounted to swing whereby it assumes a definite angular position with respect to the other member depending on the phase relation of the currents producing the two fields, and means for neutralizing the electromotive forces induced in the winding or windings by the varying magnetic field.

6. An electrical instrument comprising a member carrying windings for producing a rotating magnetic field, a member carrying a winding for producing an alternating magnetic field, one of said members being mounted to swing whereby it assumes a definite angular position with respect to the other member depending on the phase relation of the currents producing the two fields, a third member mounted to rotate with relation to the other members and carrying an additional winding or windings for neutralizing the electromotive forces induced in the winding or windings on the first-mentioned swinging member by the winding or windings on the other first-mentioned member, and means for rotating said third member and for indicating when it is in position to completely neutralize the said induced electromotive forces.

7. In an electromagnetic measuring instrument, stationary coils for setting up a rotating magnetic field, a movable coil for setting up an alternating magnetic field, means for mounting said movable coil in said rotating magnetic field, said means comprising a rotatable member and a shaft pivoted therein, a pointer connected to said shaft for indicating the displacement of said movable coil with respect to said stationary coils, a compensating coil mounted in said rotatable member and similar to said movable coil for neutralizing electromotive forces induced in said movable coil due to variations of flux therein, and a pointer attached to said rotatable member for indicating the relative position of said compensating coil to said movable coil.

8. In an electromagnetic measuring instrument, a movable coil for setting up an alternating magnetic field, stationary coils for setting up a rotating magnetic field to link said movable coil, means for indicating the displacement of said movable coil with respect to said stationary coils, a coil for neutralizing electromotive forces induced in said movable coil, and means whereby said coil may be placed parallel to said movable coil.

9. In an electromagnetic measuring instrument, stationary coils for setting up a rotating magnetic field, a movable coil mounted in said magnetic field for setting up an alternating magnetic field, means for indicating the relative displacement of said movable coil with respect to said stationary coils, a compensating coil for neutralizing electromotive forces induced therein, a rotatable member for carrying said compensating coil, and means for indicating the relative position of said compensating coil to said movable coil.

In testimony whereof I affix my signature in presence of two witnesses.

JOHN S. HOLLIDAY.

Witnesses:
A. C. NOLTE,
M. A. F. SMITH.